United States Patent [19]

Viniczay et al.

[11] 4,448,295
[45] May 15, 1984

[54] CONTROL APPARATUS FOR THE ELECTROMAGNETIC BRAKE OF A WEAVING MACHINE

[75] Inventors: Gabriella F. Viniczay, Steinach, Switzerland; Siegfried Roehrich, Götzis, Austria

[73] Assignee: Aktiengesellschaft Adolf Saurer, Arbon, Switzerland

[21] Appl. No.: 292,450

[22] Filed: Aug. 13, 1981

[30] Foreign Application Priority Data

Aug. 27, 1980 [CH] Switzerland .................. 6442/80

[51] Int. Cl.³ .................. F16D 71/00; D03D 51/18
[52] U.S. Cl. .................. 192/125 A; 139/336; 139/353; 139/370.2
[58] Field of Search .................. 192/125 A, 127, 116.5; 74/813 C; 340/677; 139/336, 353, 370.1, 370.2

[56] References Cited

U.S. PATENT DOCUMENTS

| | | | |
|---|---|---|---|
| 1,898,768 | 2/1933 | Gibbs .................. | 192/125 A |
| 2,465,829 | 3/1949 | Ancet .................. | 139/336 X |
| 2,594,209 | 4/1952 | Porter .................. | 139/370.1 X |
| 4,082,119 | 4/1978 | Washino .................. | 139/370.2 |
| 4,267,554 | 5/1981 | Loepfe et al. .................. | 340/677 |
| 4,364,002 | 12/1982 | Suzuki et al. .................. | 139/336 X |
| 4,372,346 | 2/1983 | Hutter .................. | 139/353 |

FOREIGN PATENT DOCUMENTS

| | | |
|---|---|---|
| 315770 | 6/1974 | Austria . |
| 2000361 | 11/1970 | Fed. Rep. of Germany . |
| 2543045 | 4/1976 | Fed. Rep. of Germany . |
| 2908743 | 9/1979 | Fed. Rep. of Germany ... 139/370.2 |
| 2825969 | 12/1979 | Fed. Rep. of Germany . |

*Primary Examiner*—Rodney H. Bonck
*Attorney, Agent, or Firm*—Werner W. Kleeman

[57] ABSTRACT

A control apparatus for the electromagnetic brake of a brake device or unit of a weaving machine or loom comprises a cam-controlled brake-pulse transmitter rotating with the machine shaft and two continuous signal switching stages which act upon two parallel connected AND-gates or circuits, each having connected thereafter an adjustable or regulatable time-delay element. The latter jointly cooperate with an OR-gate or circuit which delivers a related stop signal to the brake device or unit. In this way it is possible to achieve a simple, precise and reliable regulation of the angular position of the crank, so that the regulatable time-delay between the output pulse of the AND-gate and the output pulse of the time-delay element constitutes a measure for the corresponding angular position of the crank.

6 Claims, 2 Drawing Figures

CONTROL APPARATUS FOR THE ELECTROMAGNETIC BRAKE OF A WEAVING MACHINE

BACKGROUND OF THE INVENTION

The present invention relates to a new and improved control apparatus for an electromagnetic brake of a weaving machine.

Generally speaking, the control apparatus of the present development is of the type comprising at least one switching stage for generating a continuous signal which indicates a braking function and at least one switching stage for generating a pulse signal which is released at a given crank angular position of the machine, wherein the switching stage for the continuous signal and the switching stage for the pulse signal are conjointly connected to an AND-gate or circuit supplying or triggering a stop pulse for the brake device or unit which is arranged thereafter.

In order to achieve the shortest possible braking angles, the electromagnetically actuatable band or jaw brakes used with textile machines as well as the electromagnetic single disk brakes can be over energized or quickly energized by various types of switch means. In the context of this disclosure the term "braking angle" refers to the angle of rotation of the machine crankshaft or crank from the moment the electrical stop signal is generated until the complete standstill of the machine.

Especially with weaving machines or looms it becomes necessary that the loom after the braking of the crankshaft or crank comes to standstill in a clearly defined position, i.e. the so-called angular position of the crank or crankshaft, so that subsequent working cycles can be started or carried out effortlessly. For instance, after a stop following a weft thread rupture the weaving machine should stand still with the shed open, so that the weft thread rupture can be quickly repaired. On the other hand, after a stop of the loom following a warp thread rupture, the machine has to come to a stop with the shed closed. Furthermore, other angular positions of the crankshaft are conveivable at the machine, depending upon the given machine function.

In order to attain such given angular positions of the crankshaft at a weaving machine as a function of the specific branking function, such as normal loom shutdown or stop, warp thread rupture, weft thread rupture or the like, there are used control apparatuses of the initially mentioned type, wherein the braking process invariably starts from the same preadjusted angular position of the crankshaft and also ends there, provided that the braking angle at the machine shaft remains the same. The brake pulse transmitters which are used either comprise cams which are adjustable in peripheral direction at the main shaft of the machine according to each braking function. These cams cooperate with stationary switches or switches which are adjustably arranged at the main shaft of the machine and cooperate with stationary cams.

However, such multiple switch arrangements are not only expensive, but as a result of the common and frequent changes of the operating conditions at such machines also require a considerable adjustment or setting expenditure, expecially since the switches are, as a rule, arranged under coverings of the machine and at locations where access is difficult. In addition, a readjustment or fine adjustment at the switches for achieving a most precise adjustment or readjustment of the angular position of the crankshaft according to each braking function is almost impossible.

In German Pat. no. 2,825,969 published Dec. 20, 1979, proposals have been made to generate the stop pulses by digital preselection circuits at incremental or coded transmitters for the angle of the crank or crankshaft. However, this solution requires great and very expensive circuit expenditure.

SUMMARY OF THE INVENTION

Therefore, it is a primary object of the present invention to provide an improved control apparatus of the character described which is not afflicted with the described shortcomings and limitations.

Another important object of the present invention is to provide a new and improved control apparatus for an electromagnetic brake of a weaving machine of the initially mentioned type which, while being simple and inexpensive in design, avoids the aforementioned drawbacks and shortcomings of the prior art and allows at any time and immediately a new setting or readjustment of the angular position of the machine crankshaft which is associated with a braking function.

According to the invention, these and other objects are attained in that there is arranged in circuit after the AND-gate an adjustable time-delay element. The adjustable or regulatable time-delay between the output signal of the AND-gate and the output signal of the time-delay element is a measure for the angular position of the crankshaft at the machine, at the moment of the released stop pulse for the brake device or unit, or at the moment of standstill of the machine respectively.

It is thus possible, that after a once undertaken adjustment of the pulse-signal switching stage to an angular position of the crankshaft at which at the earliest there should be generated the brake signal there can be regulated any Δt time-delay which correspondingly infinitely changes trhe angular position of the crankshaft within a given or predetermined regulation range. Preferably, the control apparatus according to the invention can be constructed such that the brake signal pulse transmitter comprises an adjustable pulse generator which is controlled by the rotating machine crankshaft.

Furthermore, it is an advantage as concerns the design of the circuit if after the time-delay element there is arranged a flip-flop switching stage for generating a continuous signal with controls the brake device or unit.

For a control apparatus for a plurality of braking functions according to the invention, a further embodiment thereof can be designed such that a number of switching stages for continuous signals, corresponding to the number of braking functions, is connected in series with an AND-gate and to a time-delay element. These switching stages are connected in parallel. In this case it is an advantage, if there is arranged conjointly and forwardly to all of the AND-gates the brake pulse transmitter and if there is conjointly arranged an OR-switching stage, after all of the time-delay elements or after the flip-flop switching stages arranged thereafter. The selectable output signal of the OR-gate or OR-switching stage corresponds to the relevant braking function and forms the input signal for the brake device or unit.

BRIEF DESCRIPTION OF THE DRAWINGS

The invention will be better understood and objects other than those set forth above will become apparent when consideration is given to the following detailed description thereof. Such description makes reference to the annexed drawings of an exemplary embodiment of the invention and wherein.

DETAILED DESCRIPTION OF THE DRAWINGS

Figure 1:
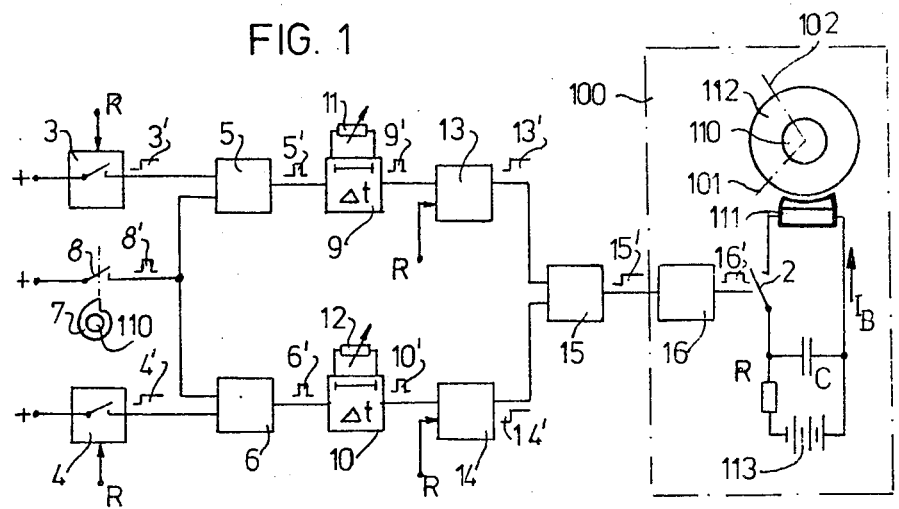
FIG. 1 is a principle schematic circuit diagram of a control apparatus according to the invention.

Describing now the drawings, the control apparatus described hereinafter is intended for a brake device or unit 100 of a weaving machine or loom, wherein the latter is only generally represented by the machine shaft 110 and by a brake disk 112 mounted thereupon and cooperating with an electromagnetic brake 111 in the brake unit 100.

The brake device or unit 100 contains its own current source 113 equipped with a parallel connected RC-element and a switch 2 which closes upon receiving a time signal or pulse 16' from a stop switching stage 16 in order to operate the electromagnetic brake 111.

At this point it should be mentioned that instead of the time signal or pulse 16' there also can be generated a continuous signal and that the brake unit 100 as well as the brake arrangement 111, 112 can be of any suitable type.

It is a primary objective that the rotating machine shaft or crankshaft 110 or the brake disk 112 rigidly mounted for rotation upon shaft 110 comes precisely to a halt, for instance in the predetermined crankshaft position 101 or 102, after the braking process has been initiated by closing the switch or contact 2.

Figure 2:
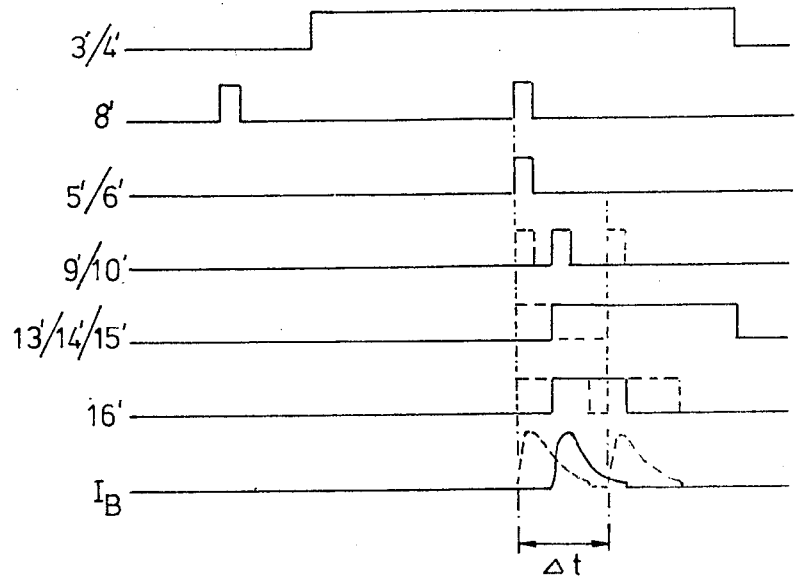
FIG. 2 is a pulse diagram of the circuit arrangement according to FIG. 1.

The braking process is started by a brake pulse transmitter 7, 8, constituting an adjustable pulse generator which generates a pulse signal at a given angular shaft position of the machine shaft or crankshaft 110. This brake pulse transmitter 7, 8 comprises a control cam 7 or equivalent structure rotating with the machine shaft 110 and actuating an electrical switch 8, at the not particularly referenced output of which there appear the pulse signals 8' (FIG. 2).

It should be mentioned that the brake pulse transmitter 7, 8 can also work contactless in an inductive, photoelectrical or capacitive manner.

It is important that the brake pulse transmitter 7, 8 only requires one single adjustment to an angular position of the crankshaft where at the earliest thereof there is to be generated a brake signal. Thus, any subsequent readjustment is unnecessary.

In the present exemplary embodiment under discussion there are intended two different braking functions where the machine is to be stopped.

For each braking function there is therefore provided a switching stage 3 and 4, respectively, which after receiving a command for stopping the machine, produces a continuous signal 3' and 4', respectively (FIG. 2).

Connected first of all in series with each switching stage 3 and 4 for generating the continuous signals 3' and 4', respectively, is an AND-gate 5 and 6, respectively, one input of which receives the related continuous signal 3' or 4', as the case may be, and the other input of which receives the periodic pulse 8' from the brake pulse transmitter 7, 8. Thus, there appears at the output of the one or other AND-gate or circuit 5 or 6 a pulse signal 5' or 6', as the case may be, simultaneous with the pulse signal 8' delivered by the brake pulse generator 7, 8, depending upon which monitoring or supervising switching stage 3 or 4 has responded (FIG. 2).

According to the invention, there is connected in series with the relevant AND-gate 5 and 6 a respective time-delay element 9 and 10 which is adjustable or regulatable by means of a related resistor 11 and 12, respectively, wherein the regulatable time delay Δt between the output pulse or signal 5' and 6', respectively, delivered by the forwardly arrange AND-gate sand 6, respectively, and the output signal 9' and 10' delivered by the related time-delay element 9 and 10 constitutes a measure for the angular position of the crankshaft 110 at the machine at the moment of release or triggering of the stop pulse signal 16' for the brake device or unit 100 or at the moment of standstill of the machine, respectively. This angle shift or time shift Δt is particularly evident in FIG. 2, wherein the current $I_B$ constitutes the excitation current surge for the electromagnetic brake 111.

In order to control the brake device or unit 100 and the stop switching stage 16 thereof by means of the continuous signal, there is arranged after each time-delay element 9 and 10 a respective flip-flop switching stage 13 or 14, which respectively supplies a continuous signal 13' and 14' in the input of an OR-gate or circuit 15 which is common to both flip-flop switching stages 13 and 14. The output signal 15' from such OR-gate 15, which is proportional either to the output signal 9' of the time-delay element 9 or to the output signal 10' of the time-delay element 10, then produces the stop or shutdown signal 16' at the output of the stop switching stage 16, whereupon the braking process is initiated and the machine crankshaft or shaft 110 comes to a halt, for instance, at the crank angular position 101 or 102.

In this way there is achieved a control apparatus for the electromagnetic brake of the weaving machine, which is simple in design and therefore economical to produce, operationally reliable and particularly easily and directly regulatable. In addition, such control apparatus is suitable for an easy retrofitting at existing machines.

While there are shown and described preferred embodiments of the invention, it is to be distinctly understood that the invention is not limited thereto but may be embodied and practised within the scope of the following claims, accordingly,

What we claim is:

1. A control apparatus for the electromagnetic brake of a weaving machine comprising:
    at least one switching stage for generating a continuous signal representative of a braking function;
    at least one switching stage for generating a pulse signal which is released periodically at a given angular position of a shaft of the machine;
    and AND-gate;
    said switching stage for the continuous signal and said switching stage for the pulse signal being commonly connected to said AND-gate which produces a stop pulse for a subsequently connected brake unit of the machine shaft;
    a time-delay element connected in circuit after said AND-gate;

said time-delay element having means for regulating the time-delay between an output pulse of said AND-gate and an output pulse of said time-delay element; and said regulatable time-delay being a measure for the angular position of the machine shaftat the moment of releasing said stop pulse for said brake unit and the moment of standstill of the machine.

2. The control apparatus as defined in claim 1, wherein:

said pulse signal switching stage comprises a brake pulse transmitter;

said brake pulse transmitter comprising an adjustable pulse generator; and said pulse generator being controlled by the rotating machine shaft.

3. The control apparatus as defined in claim 1, further including:

a flip-flop switching stage connected in circuit after said time-delay element;

said flip-flop switching stage serving for generating a continuous signal; and said continuous signal controlling said brake unit.

4. The control apparatus as defined in claim 2, further including:

a number of parallelly connected switching stages for continuous signals corresponding to the number of braking functions; and said switching stages being connected in series with its related AND-gate and time-delay element.

5. The control apparatus as defined in claim 4, wherein:

said brake pulse transmitter being connected in common with and forwardly of all said AND-gates.

6. The control apparatus as defined in claim 5, further including:

an OR-switching stage connected in common with and after all said time-delay elements;

an output signal of said OR-gate corresponding to a related braking function; and said output signal forming an input signal for said brake unit.

* * * * *